(12) United States Patent
Hsu et al.

(10) Patent No.: US 6,647,491 B2
(45) Date of Patent: *Nov. 11, 2003

(54) HARDWARE/SOFTWARE SYSTEM FOR PROFILING INSTRUCTIONS AND SELECTING A TRACE USING BRANCH HISTORY INFORMATION FOR BRANCH PREDICTIONS

(75) Inventors: Wei C. Hsu, Cupertino, CA (US); Manuel Benitez, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 60 days.

This patent is subject to a terminal disclaimer.

(21) Appl. No.: 09/968,283

(22) Filed: Oct. 1, 2001

(65) Prior Publication Data

US 2002/0019930 A1 Feb. 14, 2002

Related U.S. Application Data

(63) Continuation of application No. 09/252,567, filed on Feb. 18, 1999, now Pat. No. 6,418,530.

(51) Int. Cl.[7] .............................................. G06F 15/00
(52) U.S. Cl. ........................ 712/237; 712/233; 712/238; 712/239; 712/240; 711/202; 711/203; 711/204; 711/205; 711/206
(58) Field of Search ................................ 712/233, 237, 712/238, 239, 240; 711/202, 203, 204, 205, 206

(56) References Cited

U.S. PATENT DOCUMENTS

| 4,611,281 | A | | 9/1986 | Suko et al. | |
|---|---|---|---|---|---|
| 5,146,586 | A | | 9/1992 | Nakano | |
| 5,446,876 | A | | 8/1995 | Levine et al. | |
| 5,564,028 | A | | 10/1996 | Swoboda et al. | |
| 5,668,969 | A | | 9/1997 | Fitch | |
| 5,901,318 | A | | 5/1999 | Hsu | |
| 5,909,578 | A | | 6/1999 | Buzbee | |
| 5,948,100 | A | * | 9/1999 | Hsu et al. | 712/238 |
| 5,950,009 | A | | 9/1999 | Bortnikov et al. | |
| 6,006,033 | A | | 12/1999 | Heisch | |
| 6,009,270 | A | | 12/1999 | Mann | |
| 6,029,004 | A | | 2/2000 | Bortnikov et al. | |
| 6,055,630 | A | | 4/2000 | D'Sa et al. | |
| 6,061,776 | A | | 5/2000 | Burger et al. | |
| 6,115,809 | A | | 9/2000 | Mattson, Jr. et al. | |
| 6,164,841 | A | * | 12/2000 | Mattson et al. | 716/1 |
| 6,185,669 | B1 | | 2/2001 | Hsu et al. | |
| 6,205,545 | B1 | | 3/2001 | Shah et al. | |
| 6,327,699 | B1 | * | 12/2001 | Larus et al. | 717/128 |
| 6,351,844 | B1 | * | 2/2002 | Bala | 717/128 |
| 6,397,379 | B1 | * | 5/2002 | Yates et al. | 717/140 |
| 6,418,525 | B1 | * | 7/2002 | Charney et al. | 711/213 |
| 6,418,530 | B2 | * | 7/2002 | Hsu et al. | 712/237 |
| 6,430,675 | B1 | * | 8/2002 | Hsu et al. | 712/205 |
| 6,453,411 | B1 | | 9/2002 | Hsu et al. | |
| 2001/0056531 | A1 | * | 12/2001 | McFarling | 712/239 |

OTHER PUBLICATIONS

IBM Technical Disclosure Bulletin NB103486, Mar. 1991, US.*
Rothenberg, E., S. Bennett, and J.E. Smith. "Trace Cache: A Low Latency Approach to High Bandwidth Instruction Fetching," IEEE (1996) pp. 24–34.

* cited by examiner

Primary Examiner—Nabil El-Hady

(57) ABSTRACT

The inventive mechanism provides fast profiling and effective trace selection. The inventive mechanism partitions the work between hardware and software. The hardware automatically detects which code is executed very frequently, e.g. which code is hot code. The hardware also maintains the branch history information. When the hardware determines that a section or block of code is hot code, the hardware sends a signal to the software. The software then forms the trace from the hot code, and uses the branch history information in making branch predictions.

20 Claims, 2 Drawing Sheets

HARDWARE/SOFTWARE SYSTEM FOR PROFILING INSTRUCTIONS AND SELECTING A TRACE USING BRANCH HISTORY INFORMATION FOR BRANCH PREDICTIONS

This application is a con't of U.S. patent application Ser. No. 09/252,567 entitled "FAST INSTRUCTION PROFILING AND EFFECTIVE TRACE SELECTION," filed Feb. 18, 1999, and issued on Jul. 9, 2002, as U.S. Pat. No. 6,418,530, the disclosure of which is hereby incorporated herein by reference.

REFERENCE TO RELATED APPLICATIONS

Reference is made to the following co-pending and commonly assigned U.S. patent applications entitled EFFICIENT MAPPING TO OPTIMIZED CODE FOR PROCESSOR EMBEDDED RUN-TIME OPTIMIZER, Ser. No. 09/252,367, filed Feb. 18, 1999, and issued Feb. 6, 2001, as U.S. Pat. No. 6,185,669; which is hereby incorporated by reference, and SYSTEM AND METHOD USING A HARDWARE EMBEDDED RUN-TIME OPTIMIZER, Ser. No. 09/252,170, filed Feb. 18, 1999, and issued Sep. 17, 2002, as U.S. Pat. No. 6,453,411, which is hereby incorporated by reference.

TECHNICAL FIELD OF THE INVENTION

This application relates in general to run-time optimizers, and in specific to a mechanism for instruction profiling and trace selection.

BACKGROUND OF THE INVENTION

A run-time optimizer is an adaptive software system that transparently optimizes applications at run-time. The optimizer rewrites the binary code of an application on-the-fly to achieve a higher execution efficiency.

FIG. 3 depicts prior art run time optimizer 300. The control loop 310 begins execution of a block of program code, via emulation performed by the profiling emulator 320. The profiling aspect of emulator 320 allows the control loop 310 to track the number of time the particular block of code has been executed via emulation. Note that a run time optimization system is different from a run time binary translation system, in that the latter is for architecture migration, while the former is to decrease execution time. The run time optimization system is using the emulator 320 for profiling in order to guide optimizations, i.e. the code is running on its native system. After a predetermined number of executions via emulation, the control loop 310 designates the block of code as hot code, and desirable for optimization. The control loop 310 then activates trace selector 330 to translate the block of code. The trace selector 330 forms a trace of the instructions that comprise the block of code by following the instructions in the block. When a branch instruction is encountered, the trace selector makes a prediction as to whether the branch is taken or falls through. If the selector decides the branch is mostly taken, then the trace is formed by extending the code from the branch target block. If the selector decides not to take the branch, then the branch falls through, and the trace continues within the fall through block. The trace terminates at a backward branch predicted to take or when the trace becomes sufficiently large. After the trace is formed, the newly formed trace is optimized for the current processor. The optimized code is then placed into the code cache 340. The next time the control loop 310 encounters a condition to execute this block of code, then the control loop 310 will execute the code in the code cache 340 and not emulate the code via emulator 320.

A problem with FIG. 3 is that an emulator is required to perform profiling, i.e. the emulated code is used to determine which code is hot. Emulation is very slow; usually 50–200 times slower than native execution speed. Consequently, there is a large time penalty for determining which code is hot. Moreover, the quality of optimization is often determined by the quality of the selected trace. Branch mis-prediction in trace construction is costly, for example predicting a branch not to be taken means the remainder of the block code is traced and optimized, and if mis-predicted then that tracing and optimizing of the code subsequent to the branch is wasted. Branch mis-prediction can be minimized by maintaining a long history of branching outcomes, which is formed by continually emulating the code block. Thus, the prior art run time optimization system (RTOS) either incurs a time penalty from emulation to build a good history, or incurs a time penalty from branch mis-prediction.

Another problem with the prior art RTOS is that it attempts to translate any code that is deemed hot based on a small threshold. This problem is referred to as complex and less reliable. There are some traces that are difficult to translate, for example, it is difficult to translate a trace with a branch in the delay slot of another branch, but without a translation, the execution of the trace would be performed by software simulation or emulation. Since emulation is slow, all hot code is translated. The requirement of translating all hot code, including all the difficult traces, increases the translation time and complexity. With this software based approach, it is rather difficult to come up with an ideal threshold value. A higher threshold would incur too much overhead while a lower threshold would end up with traces in poor quality, i.e. too many traces, and traces with early exits. Note that emulation time overhead is such that a higher threshold would require the code to be emulated much longer before they get a chance to be translated.

Consequently, it is difficult for the prior art RTOS to have long cache lines to hold traces. Long cache lines are desirable because the longer the cache line, the higher the cache hit rate. However, this is difficult for the prior art RTS because traces are either inaccurately formed or require a large amount of overhead for profiling. Moreover, the traces that are formed are not reliable because of branch mis-predictions. For example, if the overhead for software based profiling takes 5% of execution time, then the run-time optimization must gain at least 5% of performance in order to break even.

The prior art RTOS has been described in terms of a pure software approach. However, another prior art approach of generating traces is in pure hardware form. However, this approach requires a great deal of complexity in the hardware to form the traces. Particularly, the hardware approach requires an additional cache for holding the trace, i.e. a trace cache. Refer to E. Rotenberg, S. Bennett, and J. E. Smith, "Trace Cache: A Low Latency Approach to High-Bandwidth Instruction Fetch," Proc. Int'l Symnp. MicroArchitcture, IEEE CS Press, Los Alamitos, Calif., 1996, which is incorporated by reference.

Therefore, there is a need in the art for RTOS that does not require emulation for profiling, produces reliable traces, and uses hot code to form traces.

SUMMARY OF THE INVENTION

These and other objects, features and technical advantages are achieved by a system and method which provides fast profiling and effective trace selection with some microarchitecture support. The instruction execution frequency and branch prediction information are collected at essentially no execution time cost. Therefore, the profiling and trace selection can have a much higher threshold and will select traces with a higher quality.

The inventive mechanism partitions the work between hardware and software. The hardware automatically detects which code is executed very frequently, e.g. which code is hot code. Hardware is better suited to this task than software, because software would require more overhead in making the determination, while hardware incurs essentially zero overhead. Moreover, since hardware executes the branch instructions, the hardware also keeps the branch history information to do branch prediction. When the hardware determines that a section or block of code is hot, e.g. hot code, the hardware sends a signal to the software, which is maintained in firmware. This signal informs the software and lets the software decide which trace to select. Because the trace latching is done by the software, it has more freedom and can handle more complex cases. Furthermore, the software may add some optimizations to hot code, and has the capability to form longer traces and better traces. Software is better suited for these tasks than hardware, because the software has more flexibility, less implementation complexity and is less expensive than hardware.

Therefore, it is a technical advantage of the present invention to have a hardware processor identify frequently used code and use software embedded in firmware predict and select traces from the frequently used code.

It is another technical advantage of the present invention to use the hardware for frequently used code identification and profiling, as hardware requires less overhead in making the determinations than software.

It is a further technical advantage of the present invention to use the software for trace prediction and selection, as software has more flexibility, less complexity and is less expensive than hardware.

It is a still further technical advantage of the present invention to use the instruction cache to maintain counters and branch information for the instructions stored in the instruction cache.

It is a still further technical advantage of the present invention to have the trace prediction and selection software be triggered by the counters in the instruction cache.

It is a still further technical advantage of the present invention to have the trace prediction and selection software make branch predictions based upon the branch history information.

It is a still further technical advantage of the present invention to have the trace prediction and selection software store the trace in trace memory.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

Figure 1A:
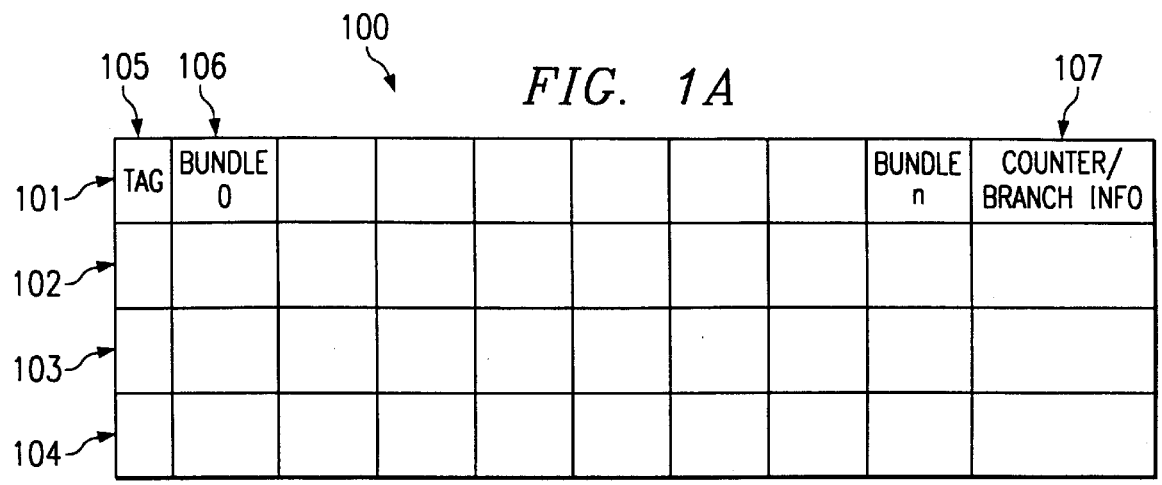
FIGS. 1A–1C depict the inventive instruction cache which includes instruction bundles and their associated counter and branch history information.
Figure 1B:
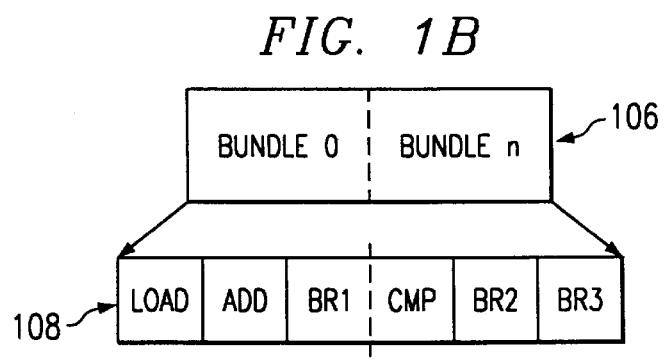

FIG. 1A depicts the inventive instruction cache (Icache) 100 of a processor, and includes long cache lines 101, 102, 103, and 104. Only four lines are depicted for simplicity, Icache 100 size is implementation dependent. Each cache line includes a tag 105, which is used to tell a cache hit or miss, a plurality of instruction bundles 106, and counter/branch information 107. FIG. 1B depicts the contents of instruction bundles 106. Each bundle is comprised of a group of instructions 108 that can be issued in the same cycle, for example, bundle 0 includes a load instruction, an add instruction, and a compare-branch instruction. Note that each bundle has a fixed number of instructions, however, some of the instructions may be NOPs.

Figure 1C:
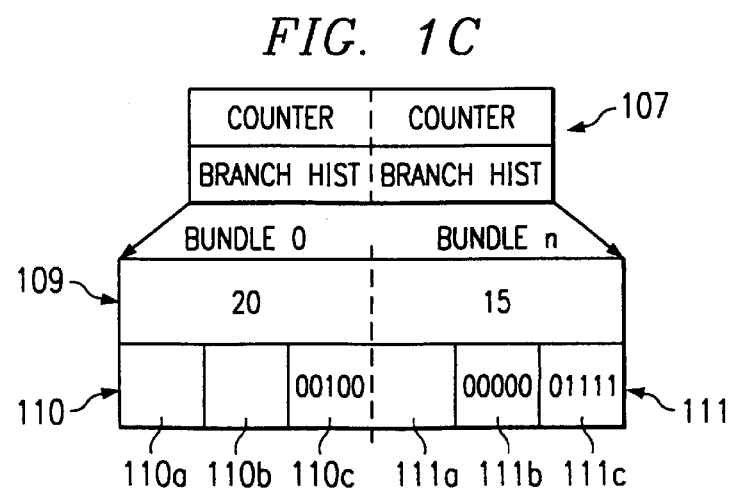

FIG. 1C depicts the counter/branch information associated with each instruction bundle. Each instruction bundle has counter information 109, which is used to determine whether the code within the bundle is hot code. When the bundle is brought into the Icache, the counter is initialized to a threshold value. Depending on the threshold value desired, the counter can be as small as 8 to 10 bits. The counter is updated when the instruction bundle is retired from the execution pipeline. Each update decrements the counter by 1. Note that the counter could initially be set to zero and increment with each retirement. However, this would require a comparison with a non-zero threshold number, e.g. 100, which requires more work than comparing with a zero threshold number.

Each instruction bundle 106 in the Icache 100 also maintains a branch history 110, 111 for each instruction within the bundle. This history describes whether the comparisons in the branch instructions have resulted in a fall through to the next instruction or a branch taken to another instruction. Branch history 110 is associated with bundle 0, including slots a, b, c, which correspond to the instructions within the bundle 0. Thus, it appears one slot in the history is allocated for each instruction in the bundle, whether the instruction is a branch instruction or not. When the instructions from the original binary are brought into the Icache, the branch history is cleared. The branch history information is updated when the instruction bundle is retired from Fie pipeline. Note that the number of instructions (and thus the number of slots) is by way of example only, as each bundle could have more or fewer instructions. Since the third instruction in bundle 0 is a branch instruction, then slot 110c has branch information. Binary zeros indicate a fall through, and binary ones indicate a branch taken. Thus, the information in 110c, i.e. 00100, indicates that of the last five times that this instruction has been executed, that the instruction BR1 has fallen through, fallen through, been taken, fallen through, and fallen through. Note that the number of bits in the history is by way of example only, and more bits could be used to provide a more detailed history (while requiring more space), while fewer bits could be used to save space (while providing less history). Note that either the most significant bit or the last significant bit may represent the most urgent execution instruction. Similarly, the information in 111*b* and 111*c* describe the histories of instruction BR2 and BR3 respectively. Note that BR2 has not recently branched, whereas the previous four executions of BR3 have resulted in the branch taken.

In operation, once the counter of a bundle reaches zero, a software component known as the trace selector 201 is invoked, via a special trap, to select a trace. Diagnose instructions (special instructions to diagnose hardware) are used by the trace selector to examine the Icache and the branch history information to form a trace. Regular instructions cannot read I-cache contents since I-cache is not part of the architecture states. Each processor has a set of diagnose instructions defined (not visible to application programmer) which can be used to examine I-cache contents.

Figure 2A:
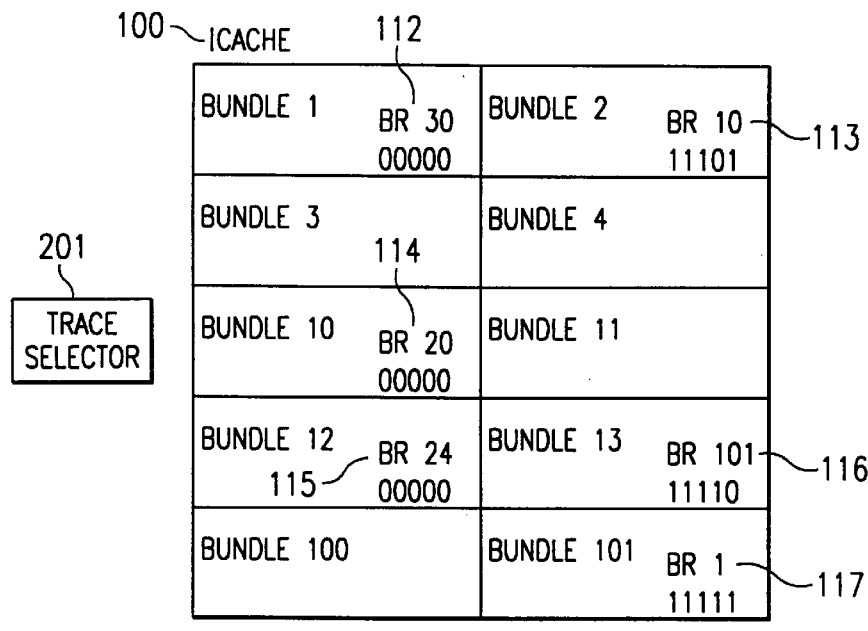
FIGS. 2A and 2B depict the inventive trace selection mechanism, which selects the trace from the instruction cache of FIG. 1A, according to the branch history information of FIG. 1C.
Figure 2B:
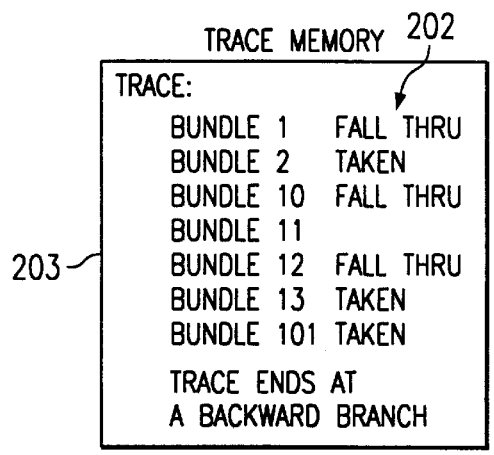
Figure 3:
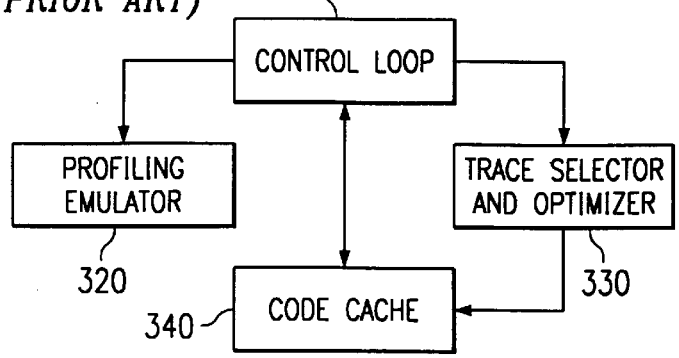
FIG. 3 depicts a prior art software emulation run time system.

FIGS. 2A and 2B depict trace formation. FIG. 2A depicts instruction bundles 106 and their associated branch information 11110. Assume that the counter of bundle 1 (not shown) has reached zero, and that bundles 5–9 and 14–99 are not shown for reason of simplicity. Note that bundles 1–101 may be in one or more cache lines of Icache 100. The trace selector 201 begins building the trace 202 from the hot code, in this case bundle 1. The trace selector 201 examines the branch information (if any) in bundle 1 to predict whether the branch will be taken or fall through. If there are no branch instructions in the bundle, then bundle will fall through to the next sequential bundle. If the trace selector determines that the branch is most likely to fall through, then the next sequential bundle is added to the trace 202, in this case it would be bundle 2. Note that if a branch instruction that is in the middle of bundle is assumed to be taken, the remaining instructions of the bundle are not included in the trace. The trace 202 is stored in the trace memory 203. If the trace selector determines that the branch is most likely to be taken, then the target bundle of the branch is added to the trace 202, in this case it would be bundle 30. After examining the branch history 112, the trace selector 201 will note that in the previous five executions of the branch instruction, the branch has not been taken and has fallen through. Therefore, the trace selector will predict that the branch to bundle 30 will not be taken, and will add the next sequential bundle, bundle 2, to the trace 202, and then will examine bundle 2.

After examining the branch history 113 of bundle 2, the trace selector 201 will note that in the previous five executions of the branch instruction, the branch has been taken four times and fallen through once. Therefore, the trace selector will predict that the branch to bundle 10 will be taken, and will add the target bundle, bundle 10, to the trace 202, and then will examine bundle 10. After examining the branch history 114 of bundle 10, the trace selector 201 will note that in the previous five executions of the branch instruction, the branch has not been taken and has fallen through. Therefore, the trace selector will predict that the branch to bundle 20 will not be taken, and will add the next sequential bundle, bundle 11, to the trace 202, and then will examine bundle 11. Bundle 11 does not contain any branch instructions, and therefore will not have a branch history, thus the trace selector 201 will add the next sequential bundle, bundle 12, to the trace 202, and then will examine bundle 12. After examining the branch history 115 of bundle 12, the trace selector 201 will note that in the previous five executions of the branch instruction, the branch has not been taken and has fallen through. Therefore, the trace selector will predict that the branch to bundle 24 will not be taken, and will add the next sequential bundle, bundle 13, to the trace 202, and then will examine bundle 13. After examining the branch history 116 of bundle 13, the trace selector 201 will note that in the previous five executions of the branch instruction, the branch has been taken four times and fallen through once. Therefore, the trace selector will predict that the branch to bundle 101 will be taken, and will add the target bundle, bundle 101, to the trace 202, and then will examine bundle 101. After examining the branch history 117 of bundle 101, the trace selector 201 will note that in the previous five executions of the branch instruction, the branch has been taken five times. Therefore, the trace selector will predict that the branch to bundle 1 will be taken. The trace selector notes that bundle 1 is already part of the trace 202 in trace memory 203, via the trace of a sequence of bundles, by examining the address of a backward branch, it can be detected whether the target bundle is already part of a trace. The trace selector then ends the trace or passes the formed trace to the optimizer.

The branch to bundle 1 from bundle 101 is known as a backward branch, which forms a loop. At this point, the trace may be stopped, as the trace would merely repeat bundles that are already present in the trace. The trace selector may also end the trace based on other criteria from a set of heuristics including the length of the trace, the number of conditional branches encountered, the probability of accumulated branch predictions and other considerations. Thus, a trace may end when its length is a multiple of a cache line size. This would make cache operations easier, as the entire line could be loaded or overwritten without having to be concerned about starting and stopping points in the middle of a cache line. The trace could also end after a certain, predetermined number of conditional branches has been encountered. Note that branch histories 113 and 116 do indicate that branch falls through occasionally, and thus the trace would be inaccurate as the trace predicts that the branch will be taken. The predetermined number could be based on the probability of error of the trace. For example, the predetermined number would be low if many of the branches have histories of 00011 or 00111. On the other hand, the predetermined number would be high if many of the branches have histories of 00000 or 11111. Note that a trace may terminate at an indirect branch since the target address is not known. An indirect branch is different from an IP-relative (or PC-relative) branch in that the branch target address cannot be computed directly from the branch instruction. Its target is stored either in a register or in a memory location. So the target address is unknown unless the instruction is actually executed. For example, Branch on reg1; branch on mem_loc1.

However, the trace selector may decide to grow the trace by predicting its most recent target from the Target Address Cache (TAC), which is a structure commonly used to predict branch target address. For a return branch which is an indirect branch, with its target being dependent on the call site, the trace selector would know the return address if the call instruction is in the trace, if the call instruction is not in the trace, the trace selector can predict the call site using the top address of the Return Stack Buffer (RSB), which is a commonly used data structure to predict return branches. The TAC and the RSB are discussed in the co-pending and commonly assigned U.S. patent application entitled EFFICIENT MAPPING TO OPTIMIZED CODE FOR PROCESSOR EMBEDDED RUN-TIME OPTIMIZER Ser. No. 09/252,367, filed Feb. 18, 1999, and issued Feb. 6, 2001, as U.S. Pat. No. 6,185,669; which is hereby incorporated by reference.

The trace 202 will be stored in the trace memory 203. There is a mapping from the trace starting instruction bundle in the original binary to the trace in the trace memory. When the trace starting bundle is executed, the mapping will automatically lead the execution to the trace stored in the trace memory 203. Typically, an executed branch instruction has its target in the trace memory. This is discussed in the co-pending and commonly assigned U.S. patent application entitled SYSTEM AND METHOD USING A HARDWARE EMBEDDED RUN-TIME OPTIMIZER Ser. No. 09/252, 170, filed Feb. 18, 1999, and issued Sep. 17, 2002, as U.S. Pat. No. 6,453,411, which is hereby incorporated by reference. Note that the trace may require more than one cache line. As stated previously, long cache lines are inefficient for original binary. This is because the original binary is loaded sequentially, i.e. bundle 1, 2, 3, 4, 5, 6, etc., and branches taken within the bundles may result in many of the loaded bundles not being used. For example, suppose bundle 6 has a branch taken to bundle 50, then the loading of bundles 7–49 represent wasted time and cache space as they are not going to be used. However, when the trace is loaded into the cache, the entire trace is almost certain to be used. Thus, the long cache lines are much more efficient, because of the sequential locality, as the bundles of the trace will (almost always) fall through to the next bundle of the trace. Note that a trace usually spans several cache lines. It may not end at the end of a cache line. In this case, the remaining part of the cache line can be the start of another trace.

Note that since traces are also brought into the Icache, the profiling and trace selection may end up generating a trace on top of an existing trace. Traces can be identified since their addresses are preserved addresses in physical memory. If their participation in subsequent trace selection is not desired, then when the trace is moved into the Icache, the counters associated with the trace will not be initialized to the threshold value, and instead are set to a null value. Thus, the trace will not participate in profiling. However, subsequent profiling and trace selection could be used to determine whether the trace is considered "good." For example, if a trace has frequent early exits, then the trace may need to be regenerated.

Note that more bits of branch history will allow for more accurate predictions to be made by the trace selector. However, this will require more cache space. Alternatively, a multi-tiered system may be used such that the trace selector would not to select a trace when a bundle traps for the first time. Instead, the trace selector may record the branch history information of the bundle in another location of memory, and then set the threshold back to a second value, which could be smaller, larger or the same as the original threshold value, and return to execution. When this bundle traps again, the trace selector can accumulate the current branch history with the branch history from the first trap to make more accurate branch predictions.

Although the present invention and its advantages have been described in detail, it should be understood that various changes, substitutions and alterations can be made herein without departing from the spirit and scope of the invention as defined by the appended claims.

What is claimed is:

1. A system for profiling instructions of a program and for selecting a trace of a portion of the instructions of the program, the system comprising:

a hardware portion for detecting which instructions of the program are more frequently executed and for maintaining a history of targets chosen by branch instructions of the program; and a software portion for forming the trace of the most frequently executed instructions and using the history in making branch predictions for branch instructions encountered in forming the trace.

2. The system of claim 1, wherein the hardware portion comprises:

a plurality of counters, with one counter associated with at least one instruction of the program, wherein a particular counter is changed each time its associated one instruction is executed;

a plurality of memory portions for storing the history, with one memory portion associated with each branch instruction of the program, wherein each memory portion maintains information on performance of the associated branch instruction, and the information is maintained for a predetermined number of times of execution of the associated branch instruction.

3. The system of claim 2, wherein:

the plurality of counters is a portion of an instruction cache; and the plurality of memory portions is another portion of the instruction cache.

4. The system of claim 2, wherein the software portion comprises:

a trace selector that forms the trace and is invoked when the one counter reaches a predetermined value;

wherein the trace selector begins the trace with the instruction associated with the one counter and ends the trace with an instruction selected by a predetermined criteria.

5. The system of claim 4, wherein:

the predetermined value is zero; and each counter is initialized to a predetermined initialization value and is decremented each time its associated one instruction is executed.

6. The system of claim 4, wherein:

the trace selector determines a branch prediction upon encountering a branch instruction, based upon the information in the memory portion of the history associated with the branch instruction.

7. The system of claim 6, wherein:

the information describes whether the branch instruction has performed one of fallen through to the next sequential instruction and taken the branch to the target instruction, during a predetermined number of prior executions of the branch instruction.

8. The system of claim 4, wherein:

the predetermined criteria is an instruction that is a backward branch which forms a loop.

9. The system of claim 4, wherein the predetermined criteria is selected from the group consisting of:

a predetermined length of the trace, a predetermined number of conditional branch instruction s within the trace, a predetermined probability of accumulate d branch predictions of the trace, and an instruction that is an indirect branch.

10. A method for profiling instructions of a program and for selecting a trace of a portion of the instructions of the program, the method comprising the steps of:

detecting, via hardware which instructions of the program are more frequently executed;

maintaining, via hardware, a history of targets chosen by branch instructions of the program; and forming the trace, via software, from the most frequently executed instructions, including the step of making branch predictions from the history for branch instructions encountered during the operation of the step of forming the trace.

11. The method of claim 10, wherein the step of detecting includes the step of providing a plurality of counters, with one counter associated with at least one instruction of the program, wherein a particular counter is changed each time its associated one instruction is executed; and the step maintaining includes the step of providing of a plurality of memory portions for storing the history, with one memory portion associated with each branch instruction of the program, wherein each memory portion maintains information on performance of the associated branch instruction, and the information is maintained for a predetermined number of times of execution of the associated branch instruction.

12. The method of claim 11, wherein:

the plurality of counters is a portion of an instruction cache; and the plurality of memory portions is another portion of the instruction cache.

13. The method of claim 11, wherein the step of forming comprises the steps of:

invoking a trace selector to form the trace when the one counter reaches a predetermined value;

beginning the trace with the instruction associated with the one counter; and ending the trace with an instruction selected by a predetermined criteria.

14. The method of claim 13, wherein the predetermined value is zero, the step of detecting comprising the steps of:

initializing each counter to a predetermined initialization value; and decrementing the one counter each time its associated one instruction is executed.

15. The method of claim 13, wherein the step of forming further comprising the step of:

determining, via the trace selector, a branch prediction upon encountering a branch instruction, based upon the information in the memory portion of the history associated with the branch instruction.

16. The method of claim 15, wherein:

the information describes whether the branch instruction has performed one of fallen through to the next sequential instruction and taken the branch to the target instruction, during a predetermined number of prior executions of the branch instruction.

17. The method of claim 13, wherein:

the predetermined criteria is an instruction that is a backward branch which forms a loop.

18. The method of claim 13, wherein the predetermined criteria is selected from the group consisting of:

a predetermined length of the trace, a predetermined number of conditional branch instructions within the trace, a predetermined probability of accumulated branch predictions of the trace, and an instruction that is an indirect branch.

19. A system for profiling instructions of a program and for selecting a trace of a portion of the instructions of the program, the system comprising:

a plurality of hardware counters, located on an instruction cache, for detecting which instructions of the program are more frequently executed, with one counter associated with at least one instruction of the program, wherein a particular counter is changed each time its associated one instruction is executed;

a plurality of hardware memory portions, located on the instruction cache, for maintaining a history of targets chosen by branch instructions of the program, with one memory portion associated with each branch instruction of the program, wherein each memory portion maintains information on performance of the associated branch instruction, and the information is maintained for a predetermined number of times of execution of the associated branch instruction; and a software trace selector that forms the trace of the most frequently executed instructions and is invoked when the one counter reaches a predetermined value, wherein the trace selector uses the history in making branch predictions for branch instructions encountered in forming the trace.

20. The system of claim 19, wherein:

the trace selector begins the trace with the instruction associated with the one counter and ends the trace with an instruction selected by a predetermined criteria;

the trace selector determines a branch prediction upon encountering a branch instruction, based upon the information in the memory portion of the history associated with the branch instruction; and the information describes whether the branch instruction has performed one of fallen through to the next sequential instruction and taken the branch to the target instruction, during a predetermined number of prior executions of the branch instruction.

* * * * *